United States Patent [19]

Cho

[11] Patent Number: 5,135,163

[45] Date of Patent: Aug. 4, 1992

[54] THREE-WAY TEMPERATURE REGULATOR VALVE CONTAINING SEPARATE VALVE ASSEMBLIES

[76] Inventor: Nakwon Cho, 3604 Kranbrook La., Knoxville, Tenn. 37921

[21] Appl. No.: 683,983

[22] Filed: Apr. 11, 1991

[51] Int. Cl.⁵ .......................................... G05D 23/02
[52] U.S. Cl. ...................................... 236/93 A; 236/100
[58] Field of Search ............ 236/12.19, 12.21, 12.20, 236/34.5, 93 A, 100

[56] References Cited

U.S. PATENT DOCUMENTS

| | | | |
|---|---|---|---|
| 1,421,830 | 7/1922 | Rayfield | 236/34.5 |
| 2,396,138 | 3/1946 | Vernet | 297/4 |
| 2,400,911 | 5/1946 | Booth | 236/34 |
| 2,417,708 | 3/1947 | Shaw | 236/34 |
| 2,810,523 | 10/1957 | Branson | 236/12 |
| 2,833,478 | 5/1958 | Middleton | 236/34 |
| 3,554,440 | 1/1971 | Austin | 236/34.5 |
| 3,913,831 | 10/1975 | Talak | 236/34.5 |
| 4,013,218 | 3/1977 | King | 236/34.5 |
| 4,082,219 | 4/1978 | Rogers, Jr. et al. | 236/12.2 |
| 4,288,033 | 9/1981 | Wisyanski | 236/93 A |
| 4,431,133 | 2/1984 | Roberson | 236/34.5 |
| 4,537,346 | 8/1985 | Duprez | 236/34.5 |

FOREIGN PATENT DOCUMENTS 218013  8/1958  Australia .

*Primary Examiner*—William E. Tapolcai
*Attorney, Agent, or Firm*—Luedeka, Hodges, Neely & Graham

[57] ABSTRACT

A thermostatically controlled three-way valve is provided with a valve actuating assembly containing a wax-type thermally responsive acutator that is mechanically separate from a valve assembly containing a valve poppet supported by a valve stem so as to facilitate the replacement of a dysfunctioning wax-type thermally responsive actuator. In the event such a problem occurs with the wax-type thermally responsive actuator due to the operation of the valve, a manual override mechanism employing a hollow threaded nut arrangement can be used to engage the valve stem and manually position the valve poppet to control fluid flow through the valve.

12 Claims, 3 Drawing Sheets

THREE-WAY TEMPERATURE REGULATOR VALVE CONTAINING SEPARATE VALVE ASSEMBLIES

BACKGROUND OF THE INVENTION

The present invention relates generally to a three-way temperature responsive regulator valve, and more particularly to such a valve in which a wax-type temperature responsive device is utilized to displace a valve poppet for controlling the flow of fluid through selected ports in the valve body.

Thermostatically controlled three-way valves are frequently employed for regulating the flow of fluid through various circuits in fluid utilizing systems on which the fluid is subjected to temperature fluctuations. The fluid utilizing systems include those which use any fluids such as hydraulic fluids, lubricating oils, and coolant fluids for system control and/or operational purposes such as employed in internal combustion engines.

Three-way temperature regulator valves, as conventionally known and used, usually contain a thermostatic control in or near one of the three fluid conveying ports or passageways in the valve body in order to operate a valve member such as a valve poppet in response to temperature variations in the fluid for the purpose of dividing or mixing the fluid within the valve. The thermostatic control frequently employed in three-way valves is a wax-type thermally responsive actuator in which a body of wax or a wax-type material is contained in a housing provided with a diaphragm-like end wall which engages and moves a valve-poppet displacing piston in response to thermally induced volume changes in the body of wax.

While the wax-type thermally responsive actuators provide a high level control over the operation of the valve in response to fluid temperature variations, it has been found that this type of actuator periodically dysfunctions, causing the valve to fail or operate in an impaired manner. Primarily, this problem with the wax-type actuators is due to the loss of wax by leakage of the wax from the wax-containing housing.

In order to assure that a three-way valve containing a wax-type thermally responsive actuator can be operated in the event of any emergency such as a dysfunction of the wax-type actuator, a manual override arrangement such as described in U.S. Pat. No. 2,810,523 has been provided. Such a manually operated arrangement includes a crank fixedly attached to a threaded valve stem so that the flow-controlling valve member or valve poppet can be manually positioned within the valve body to provide the desired control over the flow of fluid through the valve.

Previously known three-way valves using wax-type thermally responsive actuators including those with manual overrides, such as described in the aforementioned patent, suffer several shortcomings or drawbacks which detract from their overall usefulness and acceptability. For example, when a wax-type actuator becomes inoperative it is commonly replaced with a new actuator. This replacement has heretofore been a relatively complex and time consuming task, often requiring substantial disassembly of the valve so as to result in a considerable downtime of the valve or, in some instances, the removal of the valve from the fluid system. A valve typically requiring extensive effort and valve downtime for the replacement of a defective wax-type actuator is the type described in the aforementioned patent where the wax-type actuator is an integral component of the valve mechanism in the valve body.

Another drawback to the previously known three-way valves containing the wax-type thermal actuators is due to the manual override mechanism which often requires the use of a special crank arrangement fixedly attached to the valve or the use of special tooling for manually operating the valve.

SUMMARY OF THE INVENTION

It is, therefore, an object of the present invention to provide an improved three-way temperature regulator valve utilizing a wax-type thermally responsive actuator wherein the aforementioned and other shortcomings and drawbacks attendant with previously known three-way valves employing wax-type thermally responsive actuators are obviated or substantially overcome.

Another object is to provide a three-way temperature regulator valve in which the wax-type thermally responsive actuator is mechanically separate from the valve assembly incorporating a flow-controlling valve poppet so as to facilitate the removal and the replacement of the wax-type actuator.

Another object of the present invention is to provide a three-way temperature regulator valve in which the valve components housed within the valve body are contained in two separate assemblies, one of which includes a wax-type thermally responsive actuator, and the other which includes a spring-loaded valve poppet and associated valve stem.

A further object of the present invention is to provide a wax-type thermostatic control assembly which includes a slotted casing that contains a wax-type thermally responsive actuator and an override spring and is provided with mounting means for positioning the wax-type thermostatic control assembly in a port of a three-way temperature regulator valve.

A still further object of the present invention is to provide a three-way temperature regulator valve with a simple and efficient manually operable arrangement for manually overriding the wax-type thermally responsive actuator in order to operate the valve in an event of the dysfunction of the wax-type thermally responsive actuator.

Generally, the three-way temperature regulator valve of the present invention comprises a valve housing provided with first and second open-ended fluid passageways substantially disposed in axial alignment with one another. A third open-ended fluid passageway is disposed substantially perpendicular to the first and second fluid passageways and intersects these passageways at a central region of the valve housing for defining a chamber. An access opening is provided through the wall of the housing at a location in registry with the chamber and coaxially aligned with the third passageway. Also, an annular shoulder means is disposed at an end region of the third passageway and is in registry with the chamber.

A first valve assembly means extends through the access opening in the valve housing and includes valve means positionable within the chamber for selectively controlling fluid flow through any of the first, second, and third passageways. Guide means are coupled to the valve assembly means and are attached to the housing in perimetrical regions of the access opening for supporting the valve assembly means in the valve housing.

A second valve assembly means including thermally responsive means is disposed in the third passageway in the valve housing and is supported by the shoulder means at the end region of the third passageway. The thermally responsive means are adapted to contact said valve means for positioning the latter within the chamber The first valve assembly means and the second valve assembly means are mechanically separate from one another and are adapted to be sequentially placed in or removed from the valve housing. The first valve assembly means includes an elongated valve stem and a valve poppet supported thereby. The valve stem has one end thereof contactable with the thermally responsive means for the positioning of the valve poppet. An end portion of the valve stem extends from the valve housing through the access opening wherein guide means are attached to the flange means for guiding and supporting the valve stem in an axially movable manner along the longitudinal axis of the third passageway. Threaded means carried by the first valve assembly are adapted to engage end regions of the end portion of the valve stem extending from the housing for axially moving the valve stem and the valve poppet supported thereby independently of the thermally responsive means.

The thermally responsive means is a wax-type actuator which has plunger means operatively associated with the valve stem for positioning the valve poppet in the chamber in response to thermally induced volume changes in a wax body of the wax-type thermally responsive actuator.

Other and further objects of the present invention will become obvious upon an understanding of the illustrative embodiments about to be described or will be indicated in the appended claims, and various advantages not referred to herein will occur to one skilled in the art upon employment of the invention in practice.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

Figure 1:
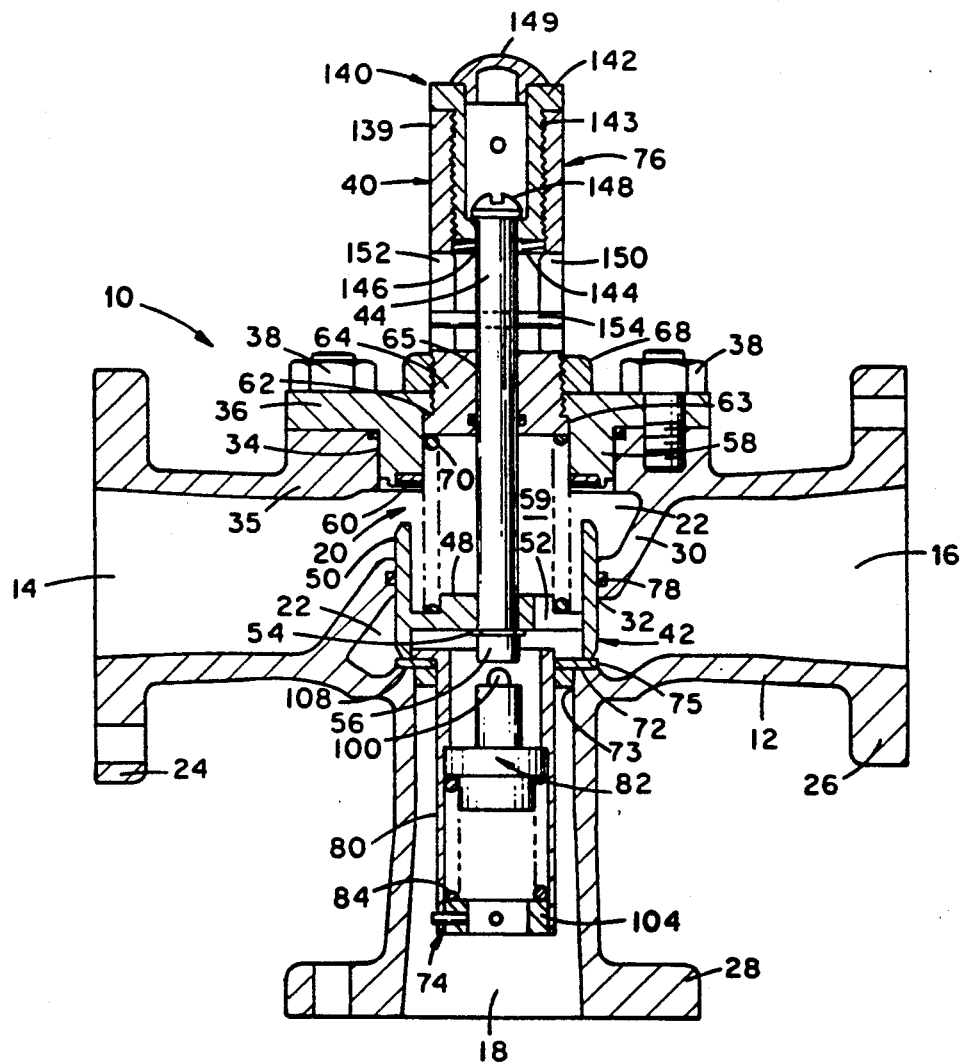
FIG. 1 is a sectional elevational view of the three-way temperature regulated valve of the present invention illustrating details of the mechanically separate valve assemblies and components thereof.

With reference to FIG. 1, the three-way temperature regulator valve of the present invention is generally shown at 10. This valve 10 comprises a valve body or housing 12 of a generally T-shaped configuration having a pair of axially aligned fluid passageways 14 and 16. A third fluid passageway 18 is disposed perpendicular to the passageways 14 and 16 and intersects these passageways at a location substantially intermediate adjacent ends thereof. These adjacent or proximal end of the passageways 14, 16, and 18 generally face one another in a central region 20 of the valve housing 12 defining a chamber 22. The distal ends of each of these passageways 14, 16 and 18 may be respectively provided with conventional mechanisms such as flanges 24, 26, and 28 for coupling the valve 10 into a fluid utilizing system. If the valve 10 is to be used as a fluid-mixing valve, passageways 14 and 16 are normally used as fluid inlet passageways while the passageway 18 will be a fluid discharge passageway. On the other hand, if the valve 10 is to be used in a divided flow system, the flow direction through these passageways is usually reversed.

The passageways 14 and 16 are separated from one another by a wall or partition 30 which diagonally spans the chamber 22 and overlies the open end of the passageway 18 in registry with the chamber 22. This partition 30 is provided with a central opening 32 which is coaxially aligned with the longitudinal axis of the passageway 18 for receiving and guiding therein a valve poppet of the fluid-flowing controlling valving mechanism, as will be described below.

The valve housing 12 has an access opening 34 through the housing wall 35 which is in registry with the chamber 22 and coaxially aligned with the longitudinal axis of the passageway 18. An annular bonnet or cap 36 of a outer diameter larger than the opening 34 is removably attached to the housing 12 in perimetrical regions thereof defining the opening 34 in any suitable manner such as by bolts or a nut and stud arrangement shown at 38. This cap 36 is attached to and supports an actuatable valve assembly 40 which includes a valve member or valve poppet 42 located in the chamber 22 and supported by an elongated valve stem 44 which has an end portion thereof extending through the chamber 22 in axial alignment with the longitudinal axis of the passageway 18. Another end portion of the valve stem 44 projects out of the housing through the cap 36.

The valve poppet 42 preferably comprises a central sprocket-like hub 48 attached to a surrounding axially extending annular sleeve or ring 50. The hub 48 has a plurality of circumferentially spaced slots 52 therethrough for the passage of fluid through the valve poppet 42. The hub 48 encircles an end region of the valve stem 44 and is movable with the valve stem 44 through the chamber 22 along an axis in alignment with the longitudinal axis of the passageway 18 for controlling fluid flow through the passageways 14, 16, and 18. An E-ring 54 is placed about the valve stem 44 near the end 56 thereof for retaining the valve poppet 42 on the valve stem 44.

The cap 36 is provided with an annular shoulder 58 which has a central opening 59 and is positioned in the opening 34 in the valve housing 12. The inner end region of the annular shoulder 58 facing the chamber 22 provides a surface contactable by the valve poppet 42 for controlling the flow of fluid through passageway 14. Preferably, the inner end of the shoulder 58 is provided with an annular valve seat 60 which is formed of a suitable metal, ceramic, or elastomeric material and is contactable by an end of the valve poppet 42. The cap 36 is also provided with an annular lip 62 which extends into the opening 59 and is contacted by an annular projection 63 on an annular elongated valve-stem guide 64 positionable in the opening 59. This guide 64 is provided with a central bore 65 for containing and guiding the valve stem 44 in a relatively movable manner. Suitable seals such as O-rings of an elastomeric material such as polytetrafluoroethylene or the like are placed at the interface between the cap 36 and the housing 12, the cap 36 and the guide 64, and the guide 64 and the movable valve stem 44 therein, for providing fluid-tight seals at these interfaces. The valve guide 64 may be removably attached to the cap 36 in any suitable manner such as by using a threaded arrangement in which a nut 68 engages a threaded outer surface on the valve guide 64.

A pre-loaded coiled compression spring 70 is positioned between the valve guide 64 and the hub 48 of the valve poppet 42 to continually urge the valve poppet 42 onto engagement with the E-ring to, in turn, urge the valve stem 44 towards the passageway 18. This displacement of the valve poppet 42 towards the passageway 18 is utilized for positioning the sleeve 50 of the valve poppet 42 on shoulder means 72 defined by perimetrical regions of the opening 73 into the passageway 18. In the absence of any temperature increase in the fluid within the valve 10, this position of the valve poppet 42 interrupts the flow of the fluid between passageway 18 and passageway 16 while establishing full fluid flow between passageway 14 and passageway 18 through the slots 52 in the valve poppet 42.

The annular sleeve 50 of the valve poppet 42 is coaxially aligned with and is of a diameter greater than both the opening 73 into the passageway 18 and the central opening 59 in the cap 36 so as to contact the annular shoulders 58 and 72, preferably with valve seats thereon, such as seat 60 on shoulder 58 and a seat 75 of similar type of material on shoulder 72, to interrupt the fluid flow between appropriate passageways in response to the position of the valve poppet 42 within the chamber 22. The valve poppet 42 is adapted to be displaced within the chamber 22 either automatically by a component of a thermally responsive valve actuating assembly 74 or manually by overriding the valve actuating assembly 74 with a manually operated valve positioning mechanism 76, both of which will be described below.

The opening 32 through the partition 30 is of a size sufficient to receive the sleeve 50 of the valve poppet 42 in close proximity thereto so as to provide a guide for the valve poppet 42 during the movement thereof through the chamber 22. An O-ring 78 of an elastomeric material, such as polytetrafluoreothylene or the like, is disposed in a suitable slot about the perimeter of the opening 32 in the partition 30 to bear against the outer surface of the sleeve 50 for providing a fluid tight seal therewith. As shown, the sleeve 50 of the valve poppet 42 is contained within the opening 32 in the partition 30 when moved to any fluid flow control position within the chamber 22 so as to assure that fluid flow between passageways 14 and 16 and passageways 14 and 18 is through the valve poppet 42.

Figure 2:
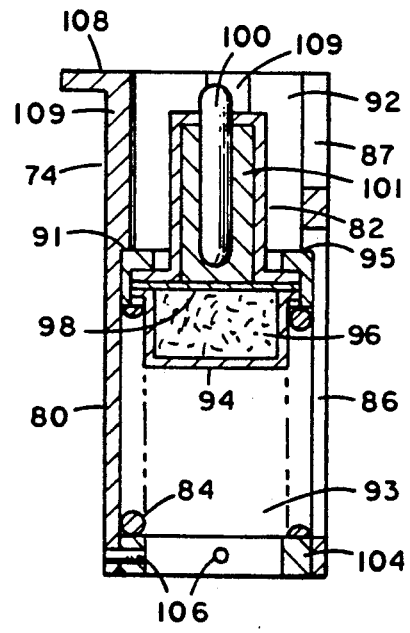
FIG. 2 is a sectional elevational view showing an embodiment of the valve assembly containing a wax-type thermally responsive actuator for operating fluid-flow controlling components in another valve assembly in response to fluid temperatures.
Figure 3:
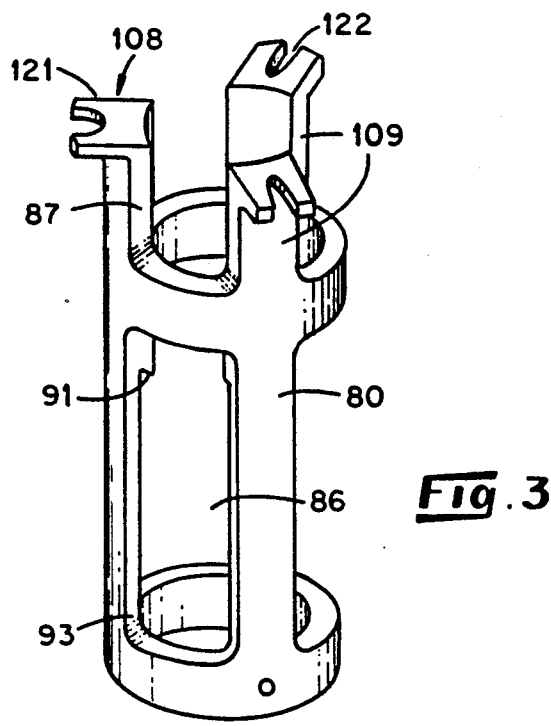
FIG. 3 is an elevational perspective view illustrating one embodiment of the casing of the valve assembly containing the wax-type thermally responsive actuator and showing the mechanisms on the casing used for mounting this assembly in a fluid passageway of the three-way valve illustrated in FIG. 1.
Figure 6:
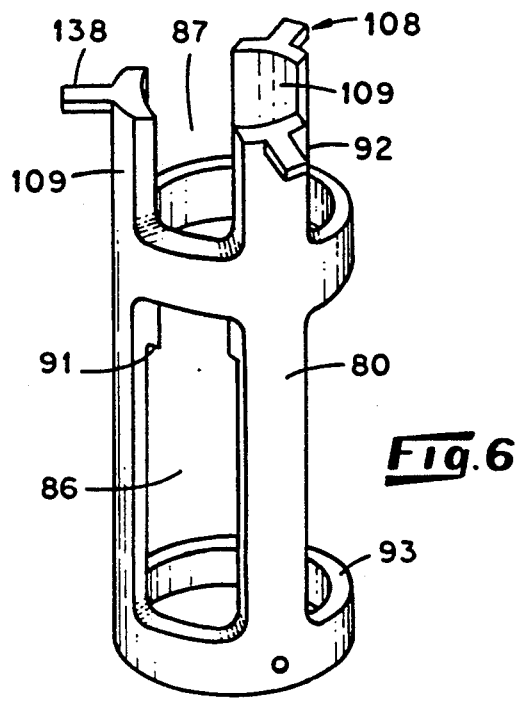
FIG. 6 is an elevational perspective view showing another embodiment of the casing of the valve assembly containing the wax-type thermally responsive actuator and showing the mechanism on the casing used for mounting this assembly in the fluid passageway of the three-way valve of FIG. 1.

In order to position the valve poppet 42 in the chamber 22 in response to variations in fluid temperature, the thermally responsive valve actuating assembly 74 is positioned within the passageway 18. This valve actuating assembly 74 as shown in FIGS. 1 and 2 includes an elongated tubular casing 80 which houses a thermally responsive actuator 82 and an overrange spring 84. The casing 80, as best shown in FIGS. 3 and 6, is provided with elongated enclosed slots 86 and open-ended slots 87 through the walls thereof at circumferential and longitudinal locations so that fluid in passageway 18 will pass through these slots and contact the thermally responsive actuator 82 within the casing 80. The thermally responsive actuator 82 may be positioned in the casing 80 against an inwardly oriented shoulder 91 generally intermediate the opposite end regions 92 and 93 of the casing 80. The thermally responsive actuator 82 includes a receptacle or housing 94 having an outwardly projecting flange 95 thereon for contacting the lip 91. The housing 94 contains a body of thermally sensitive wax-type material 96, such as a conventional wax-metal mixture, which thermally expands as the temperature thereof increases and shrinks from an expanded condition upon a decrease in the temperature thereof. The housing 94 is provided with a diaphragm-like end wall 98 of a suitable elastomeric material or metal which has one side thereof in contact with the thermally sensitive material 96 the other side thereof in operative contact with a plunger or piston 100. This piston 100, except for an end thereof, is mounted in a suitable body of elastomeric material 101 contained in an extension of the housing 94 and is displaced along the longitudinal axis of the passageway 18 in response to any thermal expansion and subsequent contraction of the thermally responsive material 96. The flange 95 on the housing 94 is continually urged into contact with the shoulder 91 by the overrange spring 84. This overrange spring 84 is provided by a coiled compression spring held in casing 80 in a pre-loaded state by an annular ring 104 attached to the inner wall of the casing 80 in the end region 93 thereof by a suitable mechanism such as pins 106.

The thermally responsive valve actuating assembly 74 is positionable within the passageway 18 at such a location that the distal end of the piston 100 of the thermally responsive actuator 82 is disposed in close proximity to the end 56 of the valve stem 44. Thus, when the temperature of the fluid in the passageway 18 increases, the thermally responsive material 96 expands to displace the piston 100 which, in turn, engages the end 56 of the valve stem 44 to axially displace the valve poppet 42 to a selected location in the chamber 22 dictated by the temperature of the fluid. As the temperature of the fluid increases in passageway 18, the expansion of the thermally responsive material 96 continues to move the valve poppet 42 away from the valve seat 75 against the bias provided by the spring 70 until the valve poppet 42 contacts the valve seat 60. When this contact occurs, any additional expansion of the thermally responsive material 96 causes the thermally responsive actuator 82 to be displaced away from the shoulder 91 against the bias provided by the overrange spring 84. In the present valve, the overrange spring 84 is more resistant to compression than the spring 70 to assure that the valve poppet 42 can traverse the full extent of the chamber 22 before any displacement of the thermally responsive actuator 82 occurs against the bias of the overrange spring 84.

In accordance with the present invention, the temperature responsive valve actuating assembly 74 is mechanically separate from the actuatable valve assembly 40 so as to be separately and sequentially placed in or removed from the valve housing 12. In order to support the temperature responsive valve actuating assembly 74 in the passageway 18 in a readily removable manner, the casing 80 is provided with lug means 108 on each of the axially extending projections 109 defined by the open-ended slots 87 for contacting appropriate lip means 110 on axially extending shoulder means 111 on the valve seat 75. With the temperature responsive valve actuating assembly 74 so supported in peripheral regions of the opening 73 into the passageway 18, the casing 80 of the thermally responsive valve actuating assembly 74 is radially inwardly spaced from the walls of the housing 12 defining the passageway 18. Also, with the temperature responsive valve actuating assembly 74 so positioned within the passageway 18, and the end 56 of the valve stem 44 is normally sufficiently close to the piston 100 attached to housing 94 of the thermally responsive valve actuating assembly 44, to prevent the valve actuating assembly from being displaced from the passageway 18 into the chamber 22.

Figure 4:
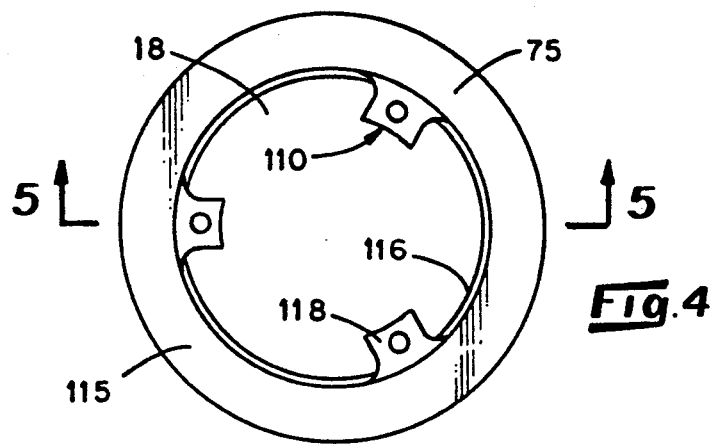
FIG. 4 is an elevational plan view showing an embodiment of a valve seat provided with lip means including pins for receiving and supporting the casing assembly illustrated in FIG. 3.
Figure 5:
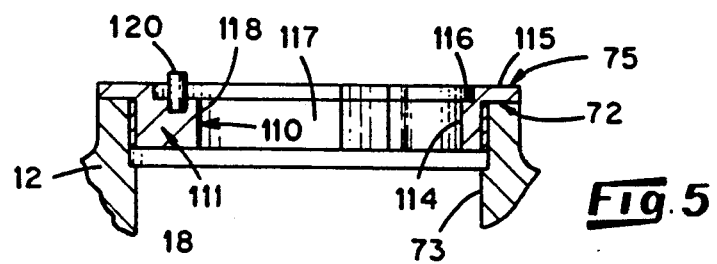
FIG. 5 is a sectional elevational view taken along line 5—5 of FIG. 4 showing further details of the valve seat and the pin-containing lip means thereon.

One embodiment of lug means and lip means utilized for supporting the temperature responsive valve actuating assembly 74 in the passageway 18 is shown in FIGS. 3–5. In this embodiment, the valve seat 75 is provided with a flanged-like tubular ring segment 114, corresponding to the shoulder means 111, that extends into the passageway 18. The valve seat 75 with the integral ring segment 114 may be pressed-fit, threadedly attached or otherwise secured to the valve housing 12 at the peripheral regions of the opening 73 into the passageway 18. As shown, the upper surface 115 of the valve seat 75 is provided with an annular recess 116 which is in a diametrical region of the ring segment 114 defining an opening 117 therethrough. A plurality of circumferentially spaced apart and radially inwardly extending lips or tabs 118 are supported by the ring segment 114 on the inner diametrical surface of the ring segment 114 defining the opening 117. Three tabs 118 are shown in FIG. 4 at uniformly spaced locations, but it will appear clear that any satisfactory number of tabs 118 may be employed. Each of these tabs 118 is provided with a bore for receiving an upright pin 120 in a secure manner such as by a pressed fit or a threaded arrangement.

The casing 80 of the temperature responsive valve actuating assembly 74 shown in FIG. 3 is provided with a plurality of the radially outwardly extending lugs 108 corresponding in number to the tabs 118 on the valve seat 75. These lugs 108 are each provided by radially extending arms 121 each with an open-ended slot 122 at the distal end thereof so that when the thermally responsive valve actuating assembly 74 is placed in the passageway 18, the arms 121 contact and rest on the tabs 118 with the pins 120 positioned in the slots 122 to prevent any displacement or rotation of the thermally responsive valve actuating assembly 74. The fit between the pins 120 and walls of the arms 121 defining the slots 122 is preferably relatively snug so as to maintain the thermally responsive valve actuating assembly 74 in the passageway 18 in the event the end 56 of the valve stem 44 is withdrawn from its contacting or near contacting relationship with the piston 100 such as would occur during a manual operation of the valve override mechanism 76, as will be described below.

Figure 7:
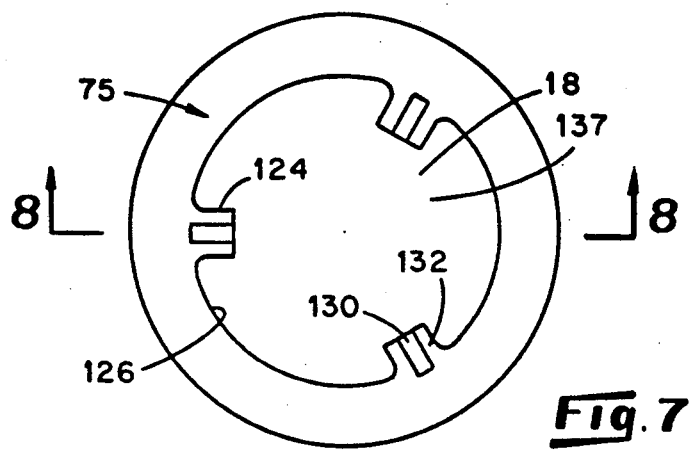
FIG. 7 is an elevational plan view illustrating a further embodiment of a valve seat provided with notched lip means for receiving and supporting the casing of the wax-type thermally responsive actuator assembly of FIG. 6.
Figure 8:
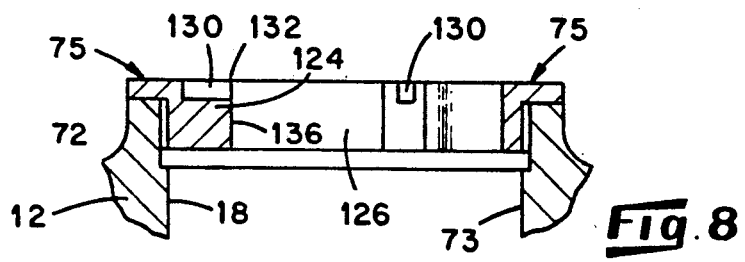
FIG. 8 is an elevational sectional view taken along lines 8—8 of FIG. 7 showing further details of the valve seat with the notched lip means thereon.

Another embodiment of the lip means and lug means for supporting the thermally responsive valve actuating assembly 74 in the passageway 18 is shown in FIGS. 6–8. In this embodiment, a plurality of lips 124 project inwardly from the inner surface of the ring segment 126 of the valve seat 75. This valve seat and ring segment is attached to the valve housing 12 in a manner substantially similar to the arrangement used for attaching the valve seat and ring segment of FIGS. 4 and 5. Three lips 124 are shown but like the lips 118 in FIGS. 4 and 5 any suitable number of lips 124 may be disposed about the ring segment 126 with this number of lips 124 corresponding to the number of lugs 108 on the casing 80. Each of these lips 124 is shown provided with an elongated radially inwardly extending notch or groove 130 in the upper surface 132 thereof with each groove 130 having an open end in registry with the inner wall 136 of the ring segment 126 defining an opening 137 through the ring segment 126. The lug means 108 on casing 80, as best shown in FIG. 6, is provided by radially extending fingers 138 of a generally rectangular configuration and of a length and size sufficient to be substantially received in the grooves 130 with a relatively snug fit therebetween.

In the event the temperature responding valve actuating assembly 74 becomes inoperative or fails to operate the valve in the prescribed manner such as caused by leakage of the wax mixture from the housing 94, the manual override mechanism 76 is used for manually displacing the valve poppet 42 within the chamber 22 to provide for the selected fluid flow through the valve passageways 14, 16, and 18. This manual override mechanism 76 is contained in the valve assembly 40 as shown in FIG. 1. The valve guide 64 is provided with an integral elongated tubular extension 139 which is coaxial with and encompasses an end portion of the valve stem 44 projecting from the valve housing 12. The valve actuating mechanism 76 is supported by the guide extension 139 and is joined to the latter by a threaded device 140 which is adapted to engage the end region 141 of the valve stem 44 and axially displace the valve stem 44 and the valve poppet 42 thereon to a selected position in the chamber 22. Preferably, the threaded device 140 is provided by a hollow nut 142 having a threaded outer surface 143 adapted to engage mating threads 144 on the inner wall of the tubular segment 139. The end region 141 of the valve stem 44 extends into the hollow nut 142 through an opening 146 at the inner end thereof and is provided with a flange member, such as a screw and washer assembly 148, for holding the valve stem 44 in the hollow nut 142 while permitting the end region 141 of the valve stem 44 to move within the hollow nut 142 in response to any displacement of the valve stem 44 by the temperature responsive valve actuating assembly 74. The screw and washer assembly 148 can be utilized as a factory-type setting to initially position the valve poppet in a contacting relationship with the seat 75. A dust cap 149 may be attached to the open end of the hollow nut 142.

As shown in FIG. 1, the tubular extension 139 is provided with elongated axially extending slots 150 and 152 through diametrically opposite sides thereof for receiving a guide pin 154 which extends through an appropriate bore in the valve stem 44. This pin-and-slot arrangement prevents rotation of the valve stem 44 and also provides a visual indication of the position of the valve stem 44 in the chamber 22 during the automatic positioning of the valve poppet 42 by the thermally responsive actuator 82 or during the manual displacement of the valve stem 44 by the rotation of the hollow nut 142.

In a typical operation of the three-way valve 10 of the present invention, the thermally responsive valve actuating assembly 74 is utilized to automatically position the valve poppet 42 in an appropriate location within the valve chamber 22 for controlling the fluid flow through any of the various passages 14, 16, and 18 when the valve 10 is used in a fluid-mixing system or a divided-flow system, such as described above. However, if the temperature responsive valve actuating assembly 74 fails to properly position the valve poppet 42 in the appropriate location within the chamber 22 such as caused by a failure or impairment of the thermally responsive actuator 82, the manual override mechanism 76 is engaged to selectively position the valve poppet 42 in the chamber 22. At a point in time when the valve 10 can be momentarily taken off line, the nuts or bolts 38 are removed and then the cap 36 with the valve assembly 40 attached thereto is removed from the valve housing 12. The thermally responsive valve actuating assembly 74 may then be simply withdrawn from the passageway 18 through the access opening 34 and then replaced with a working thermally responsive valve actuating assembly 74 of a similar construction. The cap 36 and valve actuatable assembly 40 carried thereby may then be reattached to the valve housing 12 by securing the nuts or bolts 38. This relatively simple operation requires a minimum of downtime for the valve 10 and obviates removing of the valve from the fluid system such as is often required of heretofore known three-way valves of the type utilizing wax-type thermally responsive valve actuators.

Accordingly, it will be seen that the present invention provides a substantial improvement in three-way temperature regulator valves in that the operation of the valve is achieved in a more efficient and cost-effective manner than heretofore attainable since the changing of a dysfunctioning wax-type thermally responsive actuator as periodically required can be accomplished in a more rapid and efficient manner than previously achievable. Further, the manual override mechanism provided by the present invention is substantially simpler in construction and operation than the manual override systems heretofore utilized. Also, a simple wrench or plier-type tool can be used for rotating the nut 142 of the manual override mechanism to manually position the valve poppet 42 within the chamber 22.

What is claimed is:

1. A three way temperature regulating valve comprising:
   a valve housing provided with first and second open-ended fluid passageways substantially disposed in axial alignment, a third open-ended fluid passageway disposed intermediate and substantially perpendicular to said fist and second fluid passageways and intersecting therewith at a central region of said valve housing for defining a chamber, and an access opening through a wall of said valve housing in registry with said chamber and coaxially aligned with said third passageway;
   annular shoulder means disposed on said housing at an end of said third passageway in registry with said chamber;
   first valve assembly means extending through said access opening and including valve means positionable within said chamber for selectively controlling fluid flow through any of said first, second, and third passageways; said valve means includes an elongated valve stem and a valve poppet supported thereby, wherein the valve stem has one end thereof contactable with said thermally responsive means for axial movement thereby along the longitudinal axis said third passageway, wherein said valve stem has a portion thereof extending from the said housing through said access opening, wherein said guide means support the valve stem in a relatively movable manner with respect thereto, and wherein threaded means are adapted to engage flange means on an end region of said portion of the valve stem for axially moving said valve stem and said valve poppet supported thereby independently of said thermally responsive means;
   guide means coupled to said first valve assembly means and attachable to said housing in perimetrical regions of said access opening for movably supporting said valve means; and
   second valve assembly means including thermally responsive means disposed in said third passageway and supported by said shoulder means with said thermally responsive means adapted to contact said valve means for positioning the latter within said chamber.

2. A three-way valve as claimed in claim 1, wherein said guide means includes an elongated hollow frame means that encompasses said portion of said valve stem and has throughgoing elongated slots at a location thereon intermediate a distal end thereof and said housing, wherein pin means are carried by said valve stem and are adapted to extend into said slots for inhibiting the rotation of said valve stem and for indicating the position of said valve poppet in said chamber, and wherein said threaded means comprises nut means engageable with a threaded surface on said frame means, said nut means having a recess therein for receiving said end region of the valve stem when axially moved by said thermally responsive means and includes means for engaging said flange means on said end region of the valve stem for the axial movement of the latter independently of said thermally responsive means in response to rotation of said nut means.

3. A three-way valve as claimed in claim 2, wherein spring means are disposed between said valve poppet and said flange means for continually urging said one end of said valve stem towards an engagement with said thermally responsive means while resisting the axial movement of said valve stem by said thermally responsive means, and wherein the spring means urges said valve poppet into a contacting relationship with said shoulder means.

4. A three-way valve as claimed in claim 1, wherein said annular shoulder means defines an annular seat region for contact with said valve means and includes lip means radially inwardly extending form said annular seat region, wherein said second valve assembly means has outwardly extending lug means at one end thereof for engaging said lip means to position and support said second valve assembly means in said third passageway, and wherein an end portion of said valve means is contactable with said thermally responsive means for maintaining said lug means in engagement with said lip means.

5. A three-way valve as claimed in claim 4 wherein said second valve assembly means comprises an elongated generally tubular casing of an outer diameter less than the cross-section of said third passageway encompassing said second valve assembly means, wherein said casing is provided with a plurality of axially extending throughgoing slots over a substantial length thereof, wherein an inner surface of said casing is provided with shoulder means intermediate opposite ends thereof, wherein said lug means are disposed at o ne end of said casing, wherein said thermally responsive means includes housing means containing a thermally responsive material and engageable with said shoulder means in said casing, and wherein overrange spring means are carried in said casing in an end region opposite said one end thereof and are adapted to contact said housing means for urging the latter towards said end portion of said valve means and into an engagement with said shoulder means within said casing.

6. A three-way valve as claimed in claim 5, wherein said lip means are provided by a plurality of circumferentially spaced tabs, wherein said lug means are provided by a plurality of circumferentially spaced lugs corresponding in number to said tabs, and wherein said lugs rest upon said tabs when said second valve assembly means is disposed in said third passageway.

7. A three-way valve as claimed in claim 6, wherein an axially extending pin is carried by said each of said tabs, and wherein each of said lugs has recess means at the distal end thereof for receiving and engaging each said pin.

8. A three-way valve as claimed in claim 6, wherein each of said tabs is provided with radially extending groove means, and wherein each of said lugs comprises an axially extending finger means for engaging each of said radially extending groove means.

9. A three-way valve as claimed in claim 6, wherein said thermally responsive material comprises a temperature responsive wax-metal mixture sealed in said housing means, wherein said housing means has a relatively flexible wall at one end thereof in contact with said mixture and plunger means supported by said housing means and contactable with said one end portion of said valve means for movement thereof in response to volume metric changes in said mixture to position said valve means within said chamber.

10. A three-way valve as claimed in claim 6, wherein said valve means include an elongated valve stem for providing said end portion and supporting a valve poppet thereon in one end region thereof, wherein said valve stem has one end thereof in said end region contactable by said thermally responsive means for axial movement of said valve stem, wherein said valve stem has a further end portion extending from said housing through said access opening, wherein said guide means support the valve stem in a relatively movable manner therewith, and wherein threaded means are adapted to engage an end region of said further end portion of the valve stem for effecting the axial movement of said valve stem and the valve poppet supported thereby independently of said thermal responsive means.

11. A three-way valve as claimed in claim 10, wherein said guide means includes an elongated hollow frame means which encompasses said further end portion of said valve stem and has throughgoing elongated slots at a location thereon intermediate a distal end thereof and said housing, wherein pin means are carried by said valve stem and extend into said slots for inhibiting the rotation of said valve stem and for indicating the position of said valve poppet in said chamber, wherein said threaded means comprise nut means adapted to engage a threaded surface on said frame means which have a recess therein for receiving said end region on said further end portion of the valve stem when the latter is axially moved by said thermally responsive means, wherein flange means are disposed on an end of said further end portion, and wherein said nut means are adapted to engage said flange means on the valve stem for the movement thereof independently of said thermally responsive means upon rotation of said nut means.

12. A three-way valve as claimed in claim 11, wherein spring means are disposed between said valve poppet and said guide means for urging said one end of valve stem towards said annular seat region, wherein said guide means is provided with annular valve seat means in registry with said chamber and adapted to be contacted by said valve poppet, and wherein axial movement of said valve stem by said thermally responsive means positions the valve poppet supported thereby in said chamber at locations intermediate said annular seat region and said valve seat means.

* * * * *

UNITED STATES PATENT AND TRADEMARK OFFICE
CERTIFICATE OF CORRECTION

PATENT NO. : 5,135,163
DATED : August 4, 1992
INVENTOR(S) : Nakwon Cho

It is certified that error appears in the above-identified patent and that said Letters Patent is hereby corrected as shown below:

Column 3, line 7

After "ber" insert --.--.

Column 4, line 29

After "proximal" delete "end" and insert --ends-- therefor.

Column 6, line 4

Delete "polytetrafluoreothylene" and insert --polytetrafluoroethylene-- therefor.

Claim 1, Column 10, line 2

Delete "fist" and insert --first-- therefor.

Claim 4, Column 10, line 2

Delete "form" and insert --from-- therefor.

UNITED STATES PATENT AND TRADEMARK OFFICE
CERTIFICATE OF CORRECTION

PATENT NO. : 5,135,163

DATED : August 4, 1992

INVENTOR(S) : Nakwon Cho

It is certified that error appears in the above-identified patent and that said Letters Patent is hereby corrected as shown below:

<u>Claim 5, Column 11, line 20</u>

Delete "o ne" and insert --one-- therefor.

Signed and Sealed this

Twelfth Day of October, 1993

Attest:

BRUCE LEHMAN

*Attesting Officer*  *Commissioner of Patents and Trademarks*